Figure 1:
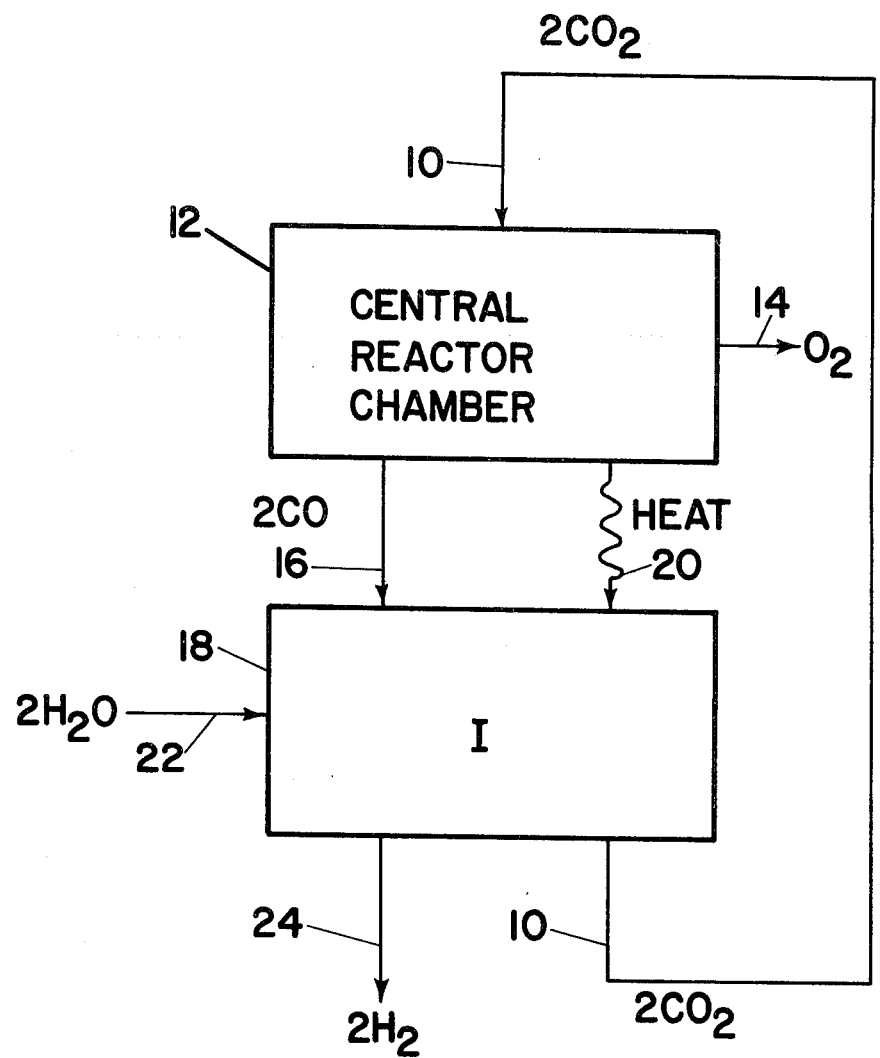

United States Patent [19]

O'Neal et al.

[11] 4,364,897

[45] Dec. 21, 1982

[54] MULTI-STEP CHEMICAL AND RADIATION PROCESS FOR THE PRODUCTION OF GAS

[75] Inventors: Russell D. O'Neal, Ann Arbor; Charles B. Leffert, Troy; Theodor Teichmann; Robert J. Teitel, both of Ann Arbor, all of Mich.

[73] Assignee: Texas Gas Transmission Corporation, Owensboro, Ky.

[21] Appl. No.: 548,230

[22] Filed: Feb. 10, 1975

[51] Int. Cl.$^3$ .................. G21B 1/00; C01B 3/12
[52] U.S. Cl. .................. 376/148; 376/324; 423/655
[58] Field of Search .................. 176/1, 3, 9, 39; 423/644, 655–657; 204/157, 1 H; 376/148, 324

[56] References Cited

U.S. PATENT DOCUMENTS

| 3,489,645 | 1/1970 | Daiber et al. ................ 176/1 |
| 3,490,871 | 1/1970 | Miller et al. ................ 423/657 |
| 3,545,926 | 12/1970 | Schlinger et al. ................ 423/656 |
| 3,758,673 | 9/1973 | Buben et al. ................ 423/656 |
| 3,802,993 | 4/1974 | von Fredersdorff ................ 176/39 |
| 3,821,358 | 6/1974 | Interrante et al. ................ 423/657 |
| 3,839,550 | 10/1974 | Wentorf, Jr. ................ 423/657 |
| 3,850,840 | 11/1974 | Aldridge et al. ................ 423/656 |
| 4,121,984 | 10/1978 | Gomberg et al. ................ 376/148 |

FOREIGN PATENT DOCUMENTS 908469 10/1962 United Kingdom ................ 176/39

OTHER PUBLICATIONS

ERDA-28, 1/75, pp. 1–3, 8–10.
MATT-1050, 8/74, pp. 526–529.
Technology Review, 12/76, pp. 20–24, 28, 32–34, 39, 41–43.
"Exploding Reactors For Power", Marwick, 1973, pp. 11, 12.
Nucleor News, May 1975, pp. 79, 80.
Wash-1267, Jul. 1973, pp. 5, 6, 10, 12, 13, 20, 21, 28, 31–34.

Primary Examiner—Harvey E. Behrend
Attorney, Agent, or Firm—Laurence R. Brown

[57] ABSTRACT

A multi-step chemical and radiolytic process for the production of gas such as hydrogen and oxygen. A highly radiosensitive gas such as carbon dioxide is injected directly into the reaction chamber of a fusion reactor and is molecularly dissociated to form carbon monoxide and pure oxygen when the fusion fuel is burned. The carbon monoxide is then mixed with steam at an elevated temperature to form carbon dioxide and pure hydrogen. The carbon dioxide is recycled and injected into the central reaction chamber to complete a closed-loop process for production of pure hydrogen and oxygen at the expense of water.

2 Claims, 2 Drawing Figures

MULTI-STEP CHEMICAL AND RADIATION PROCESS FOR THE PRODUCTION OF GAS

This invention relates to a multi-step chemical and radiation process and, more particularly, to the combining of radiolytic and chemical reactions in a particular sequence to obtain a final product.

A great deal of research is presently being conducted in the field of ignition and burn of fusion fuel such as, for example, deuterium-tritium in pellet form. The subjects under investigation include various fuel pellet configurations to achieve optimum ignition and burn, and the utilization of a laser as a source of ignition energy. U.S. Patents which illustrate generally the apparatus which may be used in this type of system are:

| | | |
|---|---|---|
| 3,378,446 | Whittlesey | 4/16/68 |
| 3,489,645 | Daiber | 1/13/70 |
| 3,624,239 | Fraas | 11/30/71 |
| 3,762,992 | Hedstrom | 10/02/73 |

The subject is also discussed in detail in an article by J. L. Emmett et al., "Fusion Power by Laser Implosion", Scientific American, Vol. 230, No. 6, pages 24–37, June 1974.

It has heretofore been proposed to use the radiation energy within the central reaction chamber of a thermonuclear reactor for the dissociation of water into hydrogen and oxygen in one step. This is described in detail in the copending application of Theodor Teichmann, Ser. No. 414,369, filed Nov. 4, 1973. In such a system a suitable volume of steam is injected into the central reaction chamber prior to ignition of the fuel pellet. Ignition and burn of the pellet causes the water molecules to dissociate into pure hydrogen and oxygen, each having molecular velocities sufficiently high to allow egress of the pure products from the chamber. The products may be thereafter separated and captured. However, the coefficient of recombination of pure hydrogen and oxygen at the elevated reaction chamber temperature is relatively high so that, while the above-referenced application discloses a workable system for obtaining pure hydrogen, the overall yield thereof is relatively low. Furthermore, it is desirable and, indeed, necessary for a safe and economical fusion system to recover any unspent tritium from the reaction chamber exhaust. However, separation of residual tritium from pure hydrogen in the chamber exhaust is relatively difficult because of the similarity in molecular weights.

It is, therefore, a general object of the present invention to provide a safe, economical and efficient method for obtaining pure gas products from a radiolytic reaction.

It is another object of the present invention to provide a method for obtaining pure hydrogen and oxygen from the dissociation of water which has an increased yield when compared with conventional radiolytic systems.

It is a further object of the present invention to provide a method of protecting the wall of the reaction chamber from the deleterious effects of charged-particle and X-ray bombardment during ignition and burn of the fuel pellet.

Figure 2:
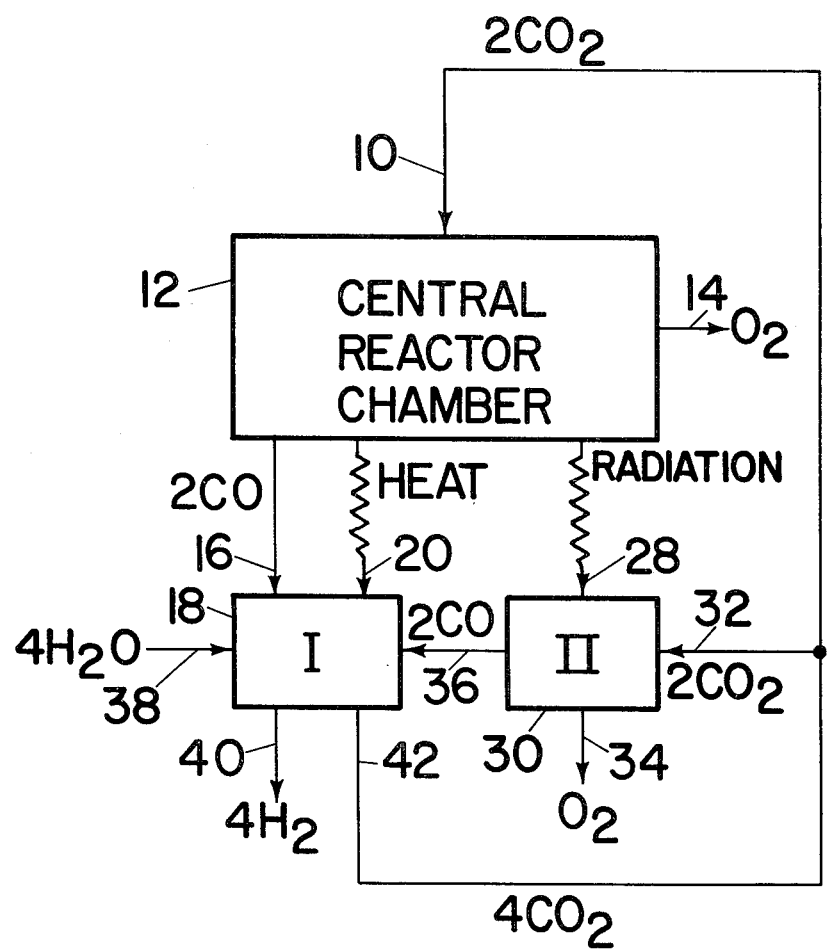

The novel features which are considered characteristic of the present invention are set forth in particular in the appended claims. The invention itself, however, together with additional objects, features and advantages thereof will be best understood from the following description when read in conjunction with the accompanying drawings in which:

FIG. 1 is a block diagram of a system for utilizing the process provided by the present invention; and FIG. 2 is a block diagram of a modified system for utilizing the process of FIG. 1.

In the process provided in accordance with the present invention pure carbon dioxide rather than steam is injected into the central reaction chamber of a thermonuclear reactor. Radiation exposure of pure carbon dioxide during fuel-pellet burn yields carbon monoxide and pure oxygen. While the oxygen may be separated and collected at the exhaust vent of the reaction chamber, the carbon monoxide is separated and then combined with water to produce pure hydrogen and reconstituted carbon dioxide. It will be evident that the reconstituted carbon dioxide may be collected and reinjected into the reaction chamber so that the overall closed-loop system produces pure hydrogen and oxygen at the expense of water.

The advantage of the present process over that disclosed in the above-referenced copending application will be readily apparent from a comparison of the composite yield or "G" factors for the following two radiolytic and/or chemical processes:

$$2H_2O + radiation \rightarrow 2H_2 + O_2 \; (G=0.5) \quad (1)$$

and $$2CO_2 + radiation \rightarrow 2CO + O_2 \; (G=10+) \quad (2)$$

$$CO + H_2O + heat \rightarrow CO_2 + H_2$$

wherein G is the number of product molecules per hundred electron volts of radiant energy absorbed. The increased efficiency of the latter process is due, in large part, to the relatively low coefficient of recombination of carbon monoxide and oxygen at the elevated temperature of the reaction chamber. For example, at a chamber temperature of 3500° K. the recombination coefficient of carbon monoxide and oxygen is only ¼ that of pure hydrogen and oxygen at the same temperature. It will also be appreciated that the heat required for the reaction of carbon monoxide with water to produce carbon dioxide and pure hydrogen may be provided by suitable heat transfer from the heated reaction chamber.

Furthermore, it will be recognized that, while the reaction chamber exhaust in process (1) includes pure hydrogen which is difficult to separate from residual tritium, the chamber exhaust in process (2) contains carbon monoxide and oxygen, both of which have molecular weights greater than that of tritium, so that any unburnt tritium in the exhaust stream may be easily collected and recycled to form additional pellet fuel. This is a significant advantage of the present invention since such tritium recovery is essential to a safe and economical fusion system.

Process (2) has yet another advantage over process (1) in that the carbon dioxide molecules injected into the reaction chamber in process (2) are much heavier than the corresponding water molecules of process (1) and, therefore, provide a more effective protection for the reaction chamber walls from the deleterious effects of charged-particle and X-ray bombardment. The process provided by the present invention thus significantly increases the operating lifetime of the central reaction chamber.

Turning now to the drawings, FIG. 1 is a block diagram of a radiation/chemical system for accomplishing process (2) provided by the present invention. Pure carbon dioxide is injected at 10 into the central reaction chamber 12 of a fusion reactor of the type disclosed in the above-referenced U.S. patents. Within chamber 12 the carbon dioxide is subjected to X-ray and particle bombardment during the burn cycle of the nuclear fuel pellet, so that the post-burn exhaust from chamber 12 includes carbon monoxide and pure oxygen. The oxygen may be separated and collected as at 14. Suitable means for separating gases at the exhaust vent of a nuclear reactor are shown, for example, in the U.S. Patents of Betteridge U.S. Pat. No. 3,406,496 and Smith et al U.S. Pat. No. 3,699,218. The carbon monoxide is likewise separated and injected at 16 into a second chamber 18 which is disposed to receive heat transfer from reaction chamber 12, as indicated at 20. At the same time, water in the form of steam is injected at 22 into chamber 18 so that the carbon monoxide reacts with the water to form the products of carbon dioxide and pure hydrogen. The hydrogen may be separated and collected, as at 24, while the carbon dioxide is recycled and injected into reaction chamber 12 as at 10. It will be apparent that the heat necessary to raise water from the liquid state to the steam state prior to injection 22 into chamber 18 may be supplied by passing the water in heat-transfer proximity to central reaction chamber 12.

A second, modified system for practicing the present invention is shown in block form in FIG. 2 wherein elements identical to corresponding elements of FIG. 1 are indicated by correspondingly identical reference numerals. The system of FIG. 2 combines the process (2) provided by the present invention with the process disclosed in the copending application of Henry J. Gomberg, Ser. No. 417,000 filed Nov. 19, 1973, to achieve an overall radiolytic/chemical system having an enhanced gas-producing efficiency. This enhanced efficiency is achieved by using the radiant energy of the pellet-burn process to dissociate carbon dioxide into carbon monoxide and oxygen within the central reaction chamber as discussed in detail above with reference to FIG. 1, and also by using the radiant energy which flows from the central chamber in the form of free neutrons to dissociate carbon dioxide into carbon monoxide and oxygen in a second radiolytic reaction chamber peripheral to the central reaction chamber.

Thus, in FIG. 2 carbon dioxide is injected at 10 into a central reaction chamber 12 and subjected to intense radiation during pellet burn. The resulting free oxygen and carbon monoxide are distributed at 14 and 16 in the same manner as indicated above with respect to FIG. 1. In the meantime, radiation in the form of high energy neutrons flows from chamber 12, as at 28, and enters a second peripheral radiolysis chamber 30 which receives an input of carbon dioxide at 32. The output of chamber 30 includes pure oxygen which is separated and collected at 34, and carbon monoxide which is injected into chamber 18 at 36. Chamber 18 thus receives carbon monoxide from two sources, central chamber 12 and peripheral 30, and may, therefore, receive an increased supply of steam at 38 to produce hydrogen at 40 and carbon dioxide at 42. The carbon dioxide may be recycled to chambers 12 and 30 at inputs 10 and 32. It will be apparent that the system of FIG. 2 efficiently uses both the internal and escaping thermal and radiant energy of central reaction chamber 12 to produce an increased quantity of pure hydrogen and oxygen as compared to the system of FIG. 1 solely at the expense of additional water.

From the foregoing description it will now be apparent that the multi-step radiolytic and chemical process provided in accordance with the present invention fully satisfies the objects, aims and advantages set forth above. Furthermore, it will be evident that, while the invention has been disclosed with reference to two specific embodiments thereof, many alternatives, modifications and variations will suggest themselves to persons skilled in the art in light of the foregoing description. Accordingly, the invention is intended to embrace all such alternatives, modifications and variations as fall within the spirit and broad scope of the appended claims.

We claim:

1. A process for producing hydrogen comprising the steps of:
   (a) injecting carbon dioxide into the central reaction chamber of a fusion reactor,
   (b) causing within said chamber a deuterium-tritium fusion reaction producing 14.1 mev neutron radiation such that said carbon dioxide is dissociated radiolytically into carbon monoxide and oxygen,
   (c) removing said carbon monoxide and oxygen from said chamber for external use,
   (d) reacting said carbon monoxide developed in step (c) with water to form carbon dioxide and pure hydrogen outside said reaction chamber, and
   (e) collecting said hydrogen developed in step (d) thereby avoiding fusion fuel contamination,
   (f) subjecting carbon dioxide obtained in step (d) to high energy neutron flux radiation escaping from said central reaction chamber to form carbon monoxide and oxygen, and
   (g) reacting said carbon monoxide developed in step (f) with water in step (d) to form carbon dioxide and hydrogen, and collecting said hydrogen developed in steps (d) and (g).

2. The process set forth in claim 1 further comprising the steps of:
   (h) collecting said carbon dioxide developed in steps (d) step (g) for subjection thereof to high energy neutron flux radiation as set forth in step (f).

* * * * *